United States Patent
Morimoto (10) Patent No.: US 7,693,409 B2
(45) Date of Patent: Apr. 6, 2010

(54) OPTICAL APPARATUS AND IMAGE PICKUP APPARATUS

(75) Inventor: Yosuke Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 11/678,108

(22) Filed: Feb. 23, 2007

(65) Prior Publication Data

US 2007/0212048 A1  Sep. 13, 2007

(30) Foreign Application Priority Data

Mar. 10, 2006  (JP)  ............. 2006-065407

(51) Int. Cl.
G03B 17/00 (2006.01)
G03B 13/00 (2006.01)
H04N 5/232 (2006.01)
G02B 15/14 (2006.01)

(52) U.S. Cl. ............ 396/85; 348/347; 359/694

(58) Field of Classification Search ............ 396/85; 348/345, 347; 359/694, 701
See application file for complete search history.

(56) References Cited

U.S. PATENT DOCUMENTS

| | | | |
|---|---|---|---|
| 5,771,410 A * | 6/1998 | Sato et al. ............ | 396/79 |
| 5,973,857 A | 10/1999 | Kaneda | |
| 7,013,082 B2 * | 3/2006 | Kaneda et al. ............ | 396/85 |
| 2004/0114251 A1 * | 6/2004 | Kaneda et al. ............ | 359/694 |
| 2006/0045508 A1 * | 3/2006 | Kushida ............ | 396/131 |
| 2007/0058960 A1 * | 3/2007 | Kato ............ | 396/80 |
| 2007/0133970 A1 * | 6/2007 | Honjo et al. ............ | 396/97 |

FOREIGN PATENT DOCUMENTS

JP  09-243899 A  9/1997

* cited by examiner

*Primary Examiner*—W. B. Perkey
*Assistant Examiner*—Noam Reisner
(74) *Attorney, Agent, or Firm*—Canon U.S.A., Inc. I.P. Division (57) ABSTRACT

At least one exemplary embodiment is directed to an optical apparatus which includes an acquisition unit adapted to acquire position information of a lens, and a control unit adapted to control a position of the lens by an amount of rotation of an operating member and the position of the lens. The control unit initializes a corresponding relationship between the amount of rotation of the operating member and the position of the lens when the position control of the lens is started.

5 Claims, 8 Drawing Sheets

OPTICAL APPARATUS AND IMAGE PICKUP APPARATUS

BACKGROUND OF THE INVENTION

1. Field of the Invention

The present invention relates to an optical apparatus including an image pickup lens and an image pickup apparatus.

2. Description of the Related Art

In an image pickup apparatus, such as a video camera and a still camera, an operating member is usually disposed to perform, for example, a zooming operation to change the zoom ratio of an optical system and a manual focusing operation to manually adjust the focus on a subject. The zoom ratio and the focus state of the optical system can be changed by moving, among lens groups constituting the optical system, a variator lens group (also called a zoom lens) and a focusing lens group (also called a focus lens) in the direction of light axis of the optical system.

The operating member for moving the lens with the zooming operation and the manual focusing operation is constituted by an operating ring fitted around a lens barrel. A rotation of the operating ring is converted to linear movements of the lens through a mechanical cam mechanism. Recently, however, a power-zoom/power-focus mechanism for electrically driving the lens by a motor has been used in many cases. In that case, the operating member is constituted by an electronic ring, a volume key, and/or a switch, and an operation input from the operating member is converted to an electric signal. A microcomputer incorporated in, e.g., a camera body detects the converted electric signal and controls the motor to perform zoom driving and manual focus driving. Such an arrangement eliminates the need of a complicated cam mechanism and enables the operating member to be disposed in a desired position. Therefore, reduction in both size and cost of the lens and the camera can be realized.

When the operating member is an electronic ring, an operation input from the operating member can be detected based on rotation of the electronic ring, and when the operating member is a volume key, an operation input from the operating member can be detected based on pressure applied to depress the volume key. In general, therefore, the electronic ring can realize finer detection of the operation input applied from a user and can provide more excellent operability than the volume key. On the other hand, a switch is inferior to the other types of operating members in operability because it is just able to detect an on- or off-state. Because the volume key and the switch are inexpensive and small in size, they are often used in relatively low-price cameras. While the electronic ring is more costly and larger in size, it is able to easily perform fine operation and to give the user an operation that is close to that in the case using the mechanical cam mechanism. For that reason, the electronic ring has greater demands among the experienced persons and is used in middle- and higher-class cameras. However, when the user holds a camera by hands, both the hands are required; namely one hand holds the camera and the other hand operates the electronic ring. In many of cameras mounting the electronic rings, therefore, the volume key or the switch is also separately disposed near a camera grip so that, though deterioration in operability, the camera can be operated by one hand while holding it.

The known techniques for the power-zoom/power-focus control will be described below. Since the zooming operation and the manual focusing operation are the same in point of controlling a lens position in accordance with an operation applied from the user, the following description is made of the zooming operation as a typical example.

In one of the known techniques for realizing the zooming operation with the electronic ring, an electric signal generated with the rotation of the electronic ring is detected and the speed of a zoom lens is controlled in accordance with the detected electric signal (see Patent Document 1; Japanese Patent Laid-Open No. 9-243899). The technique for detecting the electric signal generated with the rotation of the electronic ring is divided into the absolute value type outputting an absolute angle of the rotational position of the electronic ring, and the relative value type outputting a relative rotational angle of the electronic ring. One example of the absolute value type is to output a voltage in proportion to a rotational angle (also simply called an angle) of the electronic ring by using a variable resistance. Examples of the relative value type outputting the relative rotational angle include a type outputting an on- or off-pulse each time when the electronic ring is rotated through a predetermined angle, and a type outputting a cyclically changing voltage per a predetermined angle. The former type is realized with, e.g., a photo-interrupter, and the latter type is realized with, e.g., a magnetic resistance (MR) device (detail description of those techniques are omitted here).

The electronic ring of the absolute value type is superior to the relative value type in point of providing the absolute angle, but it is disadvantageous in having a relatively high cost and being difficult to increase resolution in angle detection. On the other hand, the relative value type electronic ring cannot provide the absolute value, but it is relatively inexpensive and can provide high resolution. For those reasons, the relative value type electronic ring is widely used.

Hitherto, as disclosed in Patent Document 1, the zooming operation by the electronic ring has been performed through the steps of detecting the amount of rotation of the electronic ring per unit time by a microcomputer, converting the detected amount of rotation to data representing the moving speed of a zoom lens, and controlling a zoom motor in accordance with the converted data. More specifically, when the electronic ring is rotated at a high speed, the zoom driving is quickly performed, and when the electronic ring is rotated at a low speed, the zoom driving is slowly performed.

With such an arrangement as enabling the zooming operation to be performed by the electronic ring through the power zoom control, a low-cost and compact image pickup lens and image pickup apparatus can be realized without using the complicated cam mechanism.

However, the above-described known techniques have problems as follows.

First, because the zoom speed is a control parameter representing the operation applied from the user operating the electronic ring, the rotational angle of the electronic ring is not matched with the zooming position, i.e., optical magnification. Even with the electronic ring rotated through the same angle, therefore, the optical magnification is, e.g., five times when the electronic ring is quickly rotated, while it is, e.g., two times when the electronic ring is slowly rotated. In the lens using the mechanical cam mechanism, since the ring rotational angle and the optical magnification correspond to each other in a 1:1 relation, the user can operate the lens in an intuitively fit manner. However, the known electronic ring cannot realize the intuitively fit operation and it is poor in operability.

Secondly, in the case of the zoom motor having a limit in speed, the zoom motor cannot be driven at a speed over the limit even when the electronic ring is rotated as quickly as possible. For example, when a stepping motor is used as the zoom motor, an upper limit has to be set in motor rotational speed to avoid an out-of-synchronism phenomenon that the motor cannot rotate at a predetermined speed or higher. With the setting of such an upper limit, in the case of a lens requiring, e.g., 2 seconds to move from the wide-angle side (wide end) to the telephoto side (tele end) even at a maximum driving speed, the lens cannot be moved from the wide end to the tele-end unless the electronic ring is continued to be rotated at least for 2 seconds. Accordingly, the amount of input operation required for the electronic ring is increased. In photographing with cameras, the optical magnification is often desired to be changed at a stroke. The lens using the mechanical cam mechanism is adaptable for such a demand because the lens can be moved from the wide end to the tele end by manually rotating the ring through a predetermined angle. As compared with that lens, the lens using the known electronic ring is inferior because the operating member requires a larger amount of input operation.

The above-described two problems are attributable to the arrangement that the moving speed of the zoom lens is controlled in accordance with the amount of input operation of the operating member. As an alternative, the arrangement may be modified such that an absolute position of the zoom lens is controlled in accordance with the amount of input operation of the operating member, i.e., that the zooming position is controlled in a 1:1 relation between an absolute angle of the electronic ring and an absolute position of the zoom lens. Such a solution should be able to realize a feel in operation comparable to that in the image pickup lens using the mechanical cam mechanism.

However, when the electronic ring of the relative value type is used as the electronic ring, information of only the relative rotational angle is obtained and control for making the absolute angle of the electronic ring and the absolute position of the zoom lens correspondent to each other in a 1:1 relation is difficult to realize. On the other hand, when the electronic ring of the absolute value type is used, information of the absolute rotational angle of the electronic ring is obtained and therefore the above-mentioned control can be more easily realized. Even in that case, however, the following problem is caused in addition to the higher cost and lower resolution of the electronic ring of the absolute value type.

In many of cameras mounting the electronic rings of the absolute angle type, the volume key is also disposed near the camera grip in addition to the electronic ring, as described above, so that the zooming operation can be performed by any of the electronic ring and the volume key. Further, the zooming operation can also be often made feasible by a device, e.g., a remote controller, other the operating member mounted on a camera body. In the case of such a device being used in combination with the electronic ring, when the position of the zoom lens is moved by the device, only the zoom lens position is changed while the angle of the electronic ring is kept the same. This raises the problem that the 1:1 correspondence between the absolute angle of the electronic ring and the absolute position of the zoom lens is lost.

With one known method for reducing the problem that the 1:1 correspondence is lost, a driving device is disposed to drive the electronic ring such that the electronic ring is also automatically rotated when the zooming position is changed by a device other than the electronic ring, thereby keeping constant the positional relationship between the electronic ring and the zoom lens. However, the one known method raises the problems that a mechanism required for the electronic ring becomes very complicated, the cost is increased, and reliability is reduced with the more complicated mechanism. With another known method, a switch for switching over an effective mode and an ineffective mode of the electronic ring operation is disposed such that the electronic ring and the other means are controlled to be exclusively used. When the electronic ring is made effective, the zoom lens is automatically moved to a position corresponding to the absolute angle of the electronic ring, thereby keeping the constant positional relationship therebetween. However, the other known method raises the problems that the switching operation using the switch is troublesome, and when the electronic ring is made effective, the zooming position is unintentionally changed.

Thus, with the known techniques and methods, even when the electronic ring of the absolute value type is used with intent to perform the control for holding the absolute angle of the electronic ring and the absolute position of the zoom lens in the 1:1 correspondence, an improvement in operability of the zooming operation is not always ensured.

SUMMARY OF THE INVENTION

The present invention provides an optical apparatus and an image pickup apparatus (e.g., a video camera and a still camera) which are able to reduce the occurrence of a malfunction caused by loss of the proper corresponding relationship between an absolute position of a lens and a rotational angle of an operating member, and which are able to realize operation in an intuitively-fit and natural way.

According to an exemplary embodiment of an aspect of the present invention, an optical apparatus includes an acquisition unit adapted to acquire position information of a lens, and a control unit adapted to control a position of the lens by an amount of rotation of an operating member and the position of the lens. The control unit initializes a corresponding relationship between the amount of rotation of the operating member and the position of the lens when the position control of the lens is started.

Further features of the present invention will become apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the present invention and, together with the description, serve to explain at least some of the principles of the present invention.

DESCRIPTION OF THE EMBODIMENTS

Exemplary embodiments of the present invention will be described in detail below with reference to the drawings. The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of motors for fine adjustment and position sensors.

In all of the examples illustrated and discussed herein any specific values should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Figure 1:
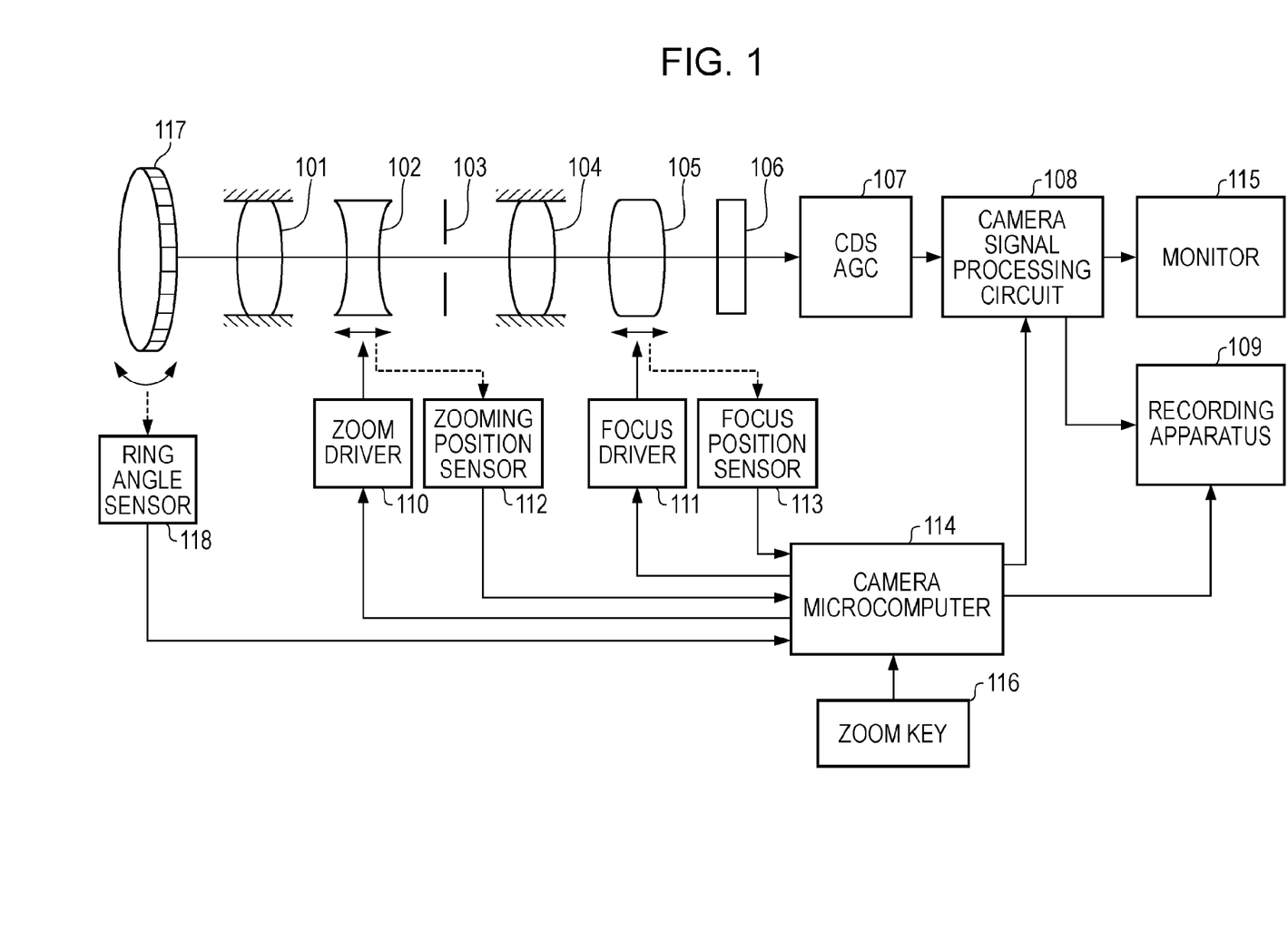
FIG. 1 is a block diagram of an image pickup apparatus according to a first exemplary embodiment of the present invention.

FIG. 1 is a block diagram of an image pickup apparatus according to a first exemplary embodiment of the present invention. The image pickup apparatus includes a first fixed lens group 101 and a zoom lens 102, i.e., a variator lens group, which performs zooming. The image pickup apparatus further includes an aperture 103 and a second fixed lens group 104. In addition, the image pickup apparatus includes a lens group 105 (hereinafter also referred to as a "focus lens") which has not only the function of adjusting the focus, but also the so-called compensation function of compensating movement of a focus plane, which is caused by the zooming. The zoom lens 102 and the focus lens 105 are driven respectively by a zoom driver 110 and a focus driver 111 such that the zoom lens 102 and the focus lens 105 are each moved in the direction of a light axis (i.e., the right-and-left direction as viewed in FIG. 1). A stepping motor or a linear-motion voice coil motor can be used as the zoom driver 110 and the focus driver 111. Positions of the zoom lens 102 and the focus lens 105 are detected respectively by a zooming position sensor 112 and a focus position sensor 113 (examples of acquisition units). When a stepping motor is used as the driver, the position sensor may count the number of input pulses starting from a datum reset point. In that case, a photointerrupter, for example, is used as a position sensor for detecting a datum point, and a boundary position where a light is shielded by a light-shield wall integrally provided on a moving lens frame is detected as the datum position. As another example of the position sensor, change of a magnetic field from a magnet scale integrally provided on the moving lens frame can be detected by using a magnetic resistance (MR) device.

An incident light from a subject is focused on an image pickup device 106 after passing through the lens groups 101-105. The image pickup device 106 is constituted by a photoelectric conversion element in the form of a CCD sensor or CMOS, for example, and converts a subject image to an electrical signal. The electrical signal is read by a CDS/AGC circuit 107 and, after amplification, it is input to a camera signal processing circuit 108. The camera signal processing circuit 108 executes predetermined image signal processing and converts the input signal to signals adapted for a recording apparatus 109 and a monitor 115. The recording apparatus 109 records the adapted signals representing the subject image on a recording medium (such as a magnetic tape, an optical disk, or a semiconductor memory). The monitor 115 displays the subject image on an electronic viewfinder, for example a liquid crystal panel.

A camera microcomputer 114 can be a microcomputer for supervising control of the entire image pickup apparatus. More specifically, the camera microcomputer 114 controls the camera signal processing circuit 108 and the recording apparatus 109. Further, lens position signals detected by the zooming position sensor 112 and the focus position sensor 113 are input to the camera microcomputer 114 and are used for a lens driving control process described later. In accordance with a result of the lens driving control process, the camera microcomputer 114 controls the zoom driver 110 and the focus driver 111, thus executing lens position control.

A ring member (hereinafter referred to simply as a "ring") 117 serves as an electronic ring, i.e., an operating member, for performing zooming operation and manual focusing operation. The ring 117 is usually disposed such that the center of rotation of the ring 117 is substantially matched with the optical center of an optical system. Since the ring itself is described above in connection with the related art, the description of the ring is omitted here. In this first exemplary embodiment, a ring of the absolute value type is used as the ring 117. An angle (change in amount of rotation) of the ring 117, i.e., an amount of operation thereof, is detected by a ring angle sensor 118, and a detected result is input to the camera microcomputer 114. While the following description is made of the case where the zoom lens 102 is controlled by ring operation, the control can also be performed in a similar manner when the focus lens 105 is controlled by the ring operation. Additionally, the ring 117 may comprise a zoom ring and a focus ring, which are separate from each other, or it can be a single ring, which is used for zooming or focusing in a switch-selectable manner. The change in amount of rotation of the ring 117 is detected herein. Alternatively, a slide member can also be used as the sliding member. In such a case, an amount of slide of the sliding member is detected as the amount of operation of the operating member.

A zoom key 116 is constituted by, e.g., a volume key or a switch, as described above in the related art, and its output is input to the camera microcomputer 114. In the case of the volume key, the zoom lens 102 is controlled by the camera microcomputer 114 so as to drive at a speed corresponding to the pressure applied to depress the volume key. Also, in the case of the switch, when the switch is turned on, the zoom lens 102 is controlled by the camera microcomputer 114 so as to drive at a predetermined speed.

Examples of a mode in which the zooming operation by the ring is effective include a mode in which the image pickup apparatus is in a photographing-enable state. When a switch device (not shown) for switching between an effective state and an ineffective state of the ring is provided, those examples include a mode in which the ring is set to the effective state. Further, when a switch device (not shown) for switching one ring between zooming and focusing is provided, there is a mode in which the zooming is selected. In addition, when the present invention is applied to manual focusing operation, the above examples include the case where a manual focusing mode is selected by a switch device (not shown) for switching between an auto focusing mode and the manual focusing mode.

In this first exemplary embodiment, at least when supply of power to the image pickup apparatus is turned on or when the image pickup apparatus is switched to the photographing-enable mode, a reset process for the position of the zoom lens 102 is usually executed. This reset process is a process of temporarily moving the zoom lens 102 to the predetermined datum point and initializing position information of the zoom lens. The datum point is detected by using, e.g., a photointerrupter. After the position reset process, the zoom lens 102 is moved to its previous position where the zoom lens 102 has been positioned when the power supply has been last turned off or when the image pickup apparatus has been last switched over to the photographing-enable mode. Such a process is intended to return the image pickup apparatus to the previous photographing state. The following initialization process is executed after the execution of the reset process.

A description of the initialization process is described below which is executed by the camera microcomputer 114 at least when the supply of power to the image pickup apparatus is turned on or when the image pickup apparatus is switched to the mode in which the operation by the zoom lens 102 is effective. In other words, with reference to a flowchart of FIG. 2, the following description is made of the process for initializing the corresponding relationship between the angle of the ring 117 and the position of the zoom lens 102 (hereinafter also referred to as the "zooming position"), which is executed prior to the start of the zooming operation.

Figure 2:
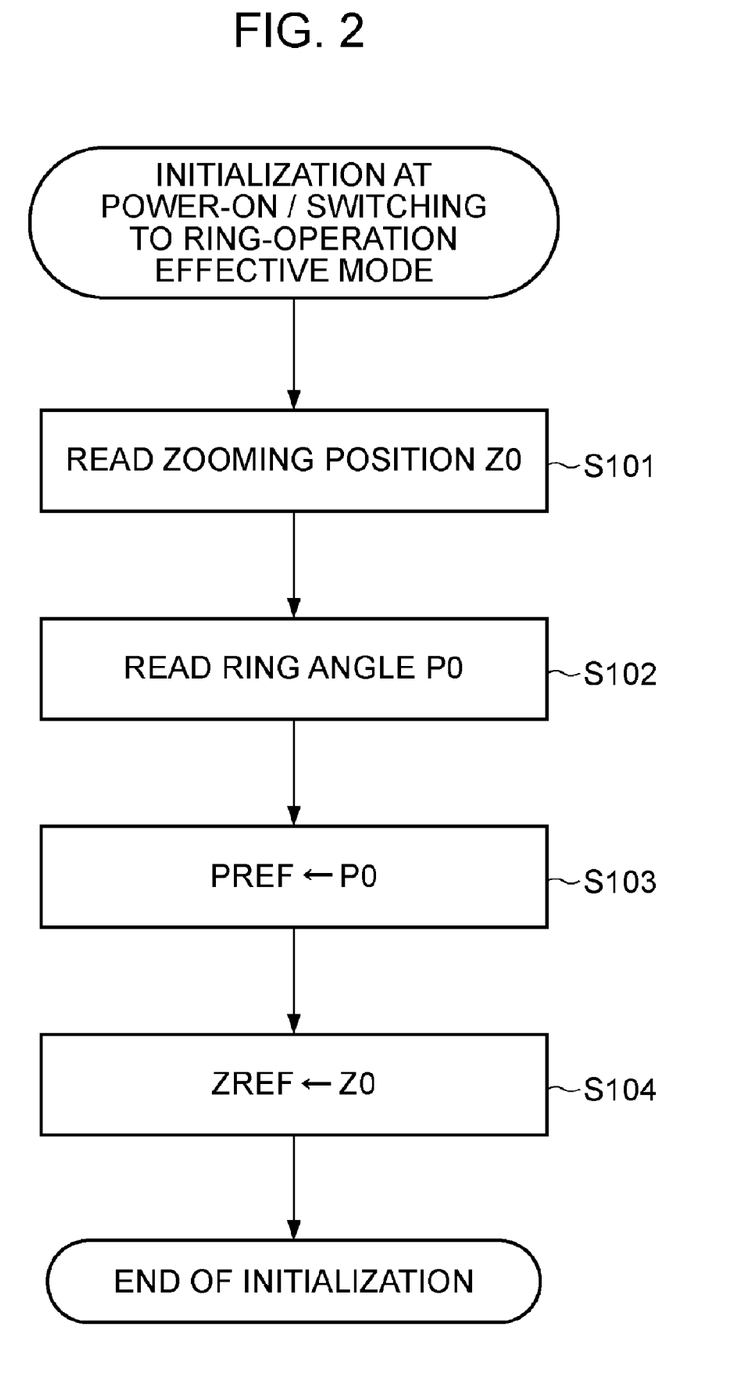
FIG. 2 is a flowchart showing an initialization process executed in the image pickup apparatus of FIG. 1 at least when supply of power to the image pickup apparatus is turned on or when a mode in which operation by a zoom ring is effective is selected.

Referring to FIG. 2, in step S101, a zooming position Z0 is first read from the zooming position sensor 112. Then, in step S102, a ring angle P0, i.e., a rotational angle of the ring 117 rotated, is read as a reference position of the ring 117 from the ring angle sensor 118. In step S103, the ring angle P0 is stored as reference data PREF for the corresponding relationship with respect to the zooming position Z0. In step S104, the zooming position Z0 is stored as reference data ZREF for the corresponding relationship with respect to the ring angle P0. As a result, an initial state of the corresponding relationship between the absolute position of the zoom lens 102 and the angle of the ring 117 is stored.

A control process executed when the user performs the zooming operation by manipulating the ring 117 or the zoom key 116 will be described below with reference to flowcharts of FIGS. 3 and 4. In the following description, it is assumed that position data of the zoom lens 102 is increased as the zoom lens 102 approaches the telephoto side (tele side). It is also assumed that, when the ring 117 is rotated in a direction in which the ring angle increases, the zoom lens 102 is controlled to move toward the tele side.

First, in step S301, a zooming position Z1 is read. Then, in step S302, a ring angle P1 is read. In step S303, operation data of the zoom key 116 (hereinafter referred to as "zoom key data") is read. In step S304, whether the zoom key 116 is operated by the user is determined from the zoom key data. If the zoom key 116 is operated, the control flow advances to a process subsequent to step S401 in FIG. 4 (described later in detail). If the zoom key 116 is not operated, the control flow advances to step S305 in which a ring operation process is executed.

If the control flow advances to step S305 with the zoom key 116 not operated, it is determined whether the ring angle P1 read in step S302 is equal to the ring angle P0 read at a previous time. If P1 and P0 differ from each other, this means that the ring has been operated. The control flow, therefore, advances to step S306. In step S306, a difference dP between the reference data PREF of the ring angle and the read ring angle P1 is calculated. Then, in step S307, dP is multiplied by a predetermined gain G to calculate a difference dZ of the zooming position corresponding to the difference dP of the ring angle. Herein, the gain G can be decided from a variable stroke LZ of the zoom lens 102 and a corresponding rotational angle $\theta WT$ of the ring 117 as follows:

$$G = LZ/\theta WT$$

In other words, the zoom lens 102 is moved from the wide end to the tele end by rotating the ring 117 through the angle $\theta WT$.

In step S308, the difference dZ of the zooming position calculated in step S307 is added to the reference data ZREF of the zooming position, thereby calculating a zooming target position ZTGT corresponding to the ring angle P1 based on the preset corresponding relationship. By moving the zoom lens 102 to the zooming target position ZTGT in accordance with the ring operation applied from the user, the zooming position is controlled in its absolute position depending on the input amount of the ring operation. Thus, the zoom lens 102 can be moved through a distance of movement which is decided based on the preset relationship of the position of the zoom lens 102 corresponding to a degree of rotation of the ring 117.

In step S309, it is determined whether the zooming target position ZTGT is larger than a tele end position ZTELE of the zoom lens 102. The zoom lens 102 cannot be moved beyond the tele end position ZTELE. Therefore, if the zooming target position ZTGT is larger than the tele end position ZTELE, the control flow advances to step S310 in which the zooming target position ZTGT is changed to the tele end position ZTELE. Then, the control flow advances to step S313. With that process, the preset corresponding relationship between the absolute position of the zoom lens 102 and the degree of rotation of the ring 117 is temporarily canceled.

On the other hand, if the zooming target position ZTGT is smaller than a tele end position ZTELE, the control flow advances to step S311 in which it is determined whether the zooming target position ZTGT is smaller than a wide end position ZWIDE. The zoom lens 102 cannot be moved beyond the wide end position ZWIDE. Therefore, if the zooming target position ZTGT is smaller than the wide end position ZWIDE, the control flow advances to step S312 in which the zooming target position ZTGT is changed to the wide end position ZWIDE. Then, the control flow advances to step S313. With that process, the preset corresponding relationship between the absolute position of the zoom lens 102 and the degree of rotation of the ring 117 is temporarily canceled.

If the zooming target position ZTGT is larger than the wide end position ZWIDE, the zooming target position ZTGT is within a zoom movable range. Therefore, the control flow advances to step S313 without changing the zooming target position ZTGT.

In step S313, it is determined whether the zooming position Z1 is matched with the zooming target position ZTGT. Because dZ is not 0 during the ring operation, the zooming position Z1 is usually not matched with the zooming target position ZTGT. Therefore, the control flow advances to step S314. In step S314, it is determined whether the zooming position Z1 is smaller than the zooming target position ZTGT. If the zooming position Z1 is smaller than the zooming target position ZTGT, the control flow advances to step S315 in which the zoom lens 102 is driven in the tele direction. Conversely, if the zooming position Z1 is larger than the zooming target position ZTGT, the control flow advances to step S316 in which the zoom lens 102 is driven in the wide direction. In any case, the control flow finally advances to step S317 in which the current ring angle P1 is stored in place of the previous ring angle P0 to be ready for the next processing. Thereafter, the control flow returns to step S301.

If it is determined in step S305 that the ring operation is not performed, the control flow skips directly to step S313 without executing steps S306-S312. In this first exemplary embodiment, even with the ring operation being stopped, if it is determined in step S313 that the zooming position Z1 is not matched with the zooming target position ZTGT, the processing of steps S314-S316 is executed to continue the driving of the zoom lens 102 until the zooming position Z1 is matched with the zooming target position ZTGT. Such a process is performed in consideration of the case that, when a motor for driving the zoom lens 102 has a speed limit, the zoom lens 102 cannot follow the ring operation when the ring 117 is very quickly rotated. By executing the control in such a manner, although the lens driving is delayed, the relationship between the angle of the ring 117 and the absolute position of the zoom lens 102 can be held in the preset 1:1 correspondence.

The determination in step S305 as to whether the ring operation is performed can be made, as described above, by determining whether P1 and P0 are equal to each other. However, when the detected signal of the angle of the ring 117 includes noise or other disturbance, P1 may differ from P0 even when the ring 117 is stopped. To avoid false determination in such a case, the determination as to the ring operation (zooming operation) can be made by determining whether a difference between P1 and P0 is smaller than a predetermined threshold. The false determination can be avoided by setting the predetermined threshold to a value larger than the noise included in the detected signal of the ring angle.

Figure 5:
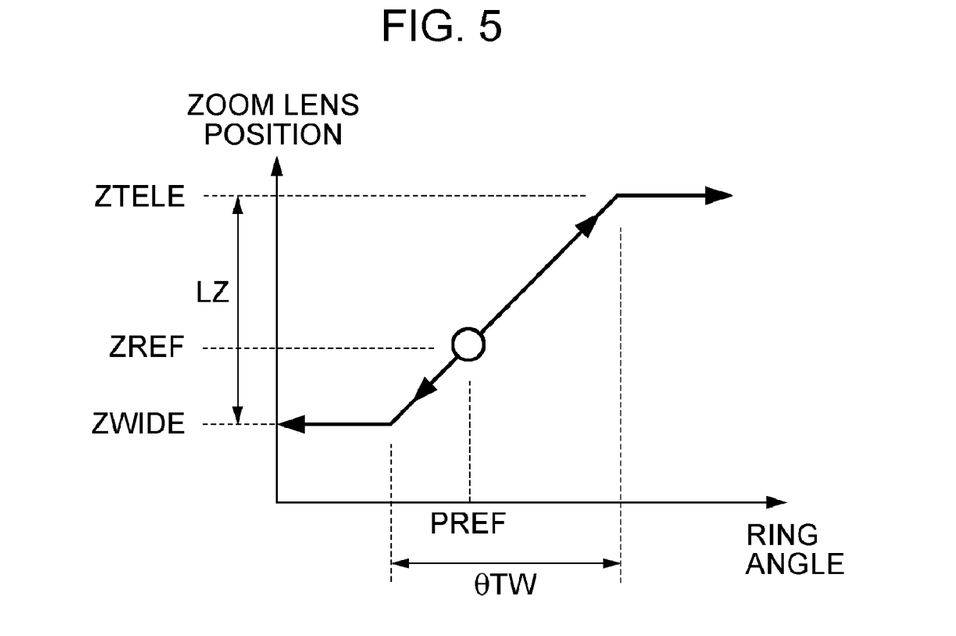
FIG. 5 is a graph showing the relationship between an absolute position of a zoom lens and a ring angle in the first exemplary embodiment of the present invention.

FIG. 5 shows the relationship between the absolute position of the zoom lens 102 and the angle of the ring 117 in the process described above. As shown in FIG. 5, with the reference data PREF of the ring angle and the reference data ZREF of the zooming position set to define the datum point (indicated by a circle), when the ring 117 is rotated in the plus (positive) direction, the zoom lens 102 is moved in the tele direction. Also, when the ring 117 is rotated in the minus (negative) direction, the zoom lens 102 is moved in the wide direction. The relationship between the absolute position of the zoom lens 102 and the angle of the ring 117 is thereby held in the 1:1 correspondence. However, when the zoom lens 102 reaches the tele end position ZTELE, the zooming position is kept at the tele end position ZTELE even when the ring 117 is further rotated in the plus direction. Similarly, when the zoom lens 102 reaches the wide end position WIDE, the zooming position is kept at the wide end position ZWIDE even when the ring 117 is further rotated in the minus direction.

Returning to FIG. 3, if it is determined in step S313 that the zooming position Z1 is matched with the zooming target position ZTGT, the control flow advances to step S318 in which the driving of the zoom lens 102 is stopped. Then, in step S319, it is determined whether the zooming position Z1 is matched with the tele end position ZTELE. If not matched, the control flow advances to step S320 in which it is determined whether the zooming position Z1 is matched with the wide end position ZWIDE. If not matched, the control flow advances to step S317. The subsequent processing is executed as described above.

On the other hand, if it is determined in step S319 or step S320 that the zooming position Z1 is matched with the tele end position ZTELE or the wide end position ZWIDE, the control flow advances to step S321 in any case. In step S321, the reference data ZREF of the zooming position is re-initialized to Z1 based on the zooming position Z1. Further, in step S322, the reference data PREF of the ring angle is re-initialized to P1 based on the ring angle P1. As a result, the corresponding relationship between the absolute position of the zoom lens 102 and the degree of rotation of the ring 117, which has been temporarily cleared and canceled, is updated and held again. Thereafter, the control flow advances to step S317 and the subsequent processing is continued. The canceling and the updating can be performed at the same time.

Figure 6:
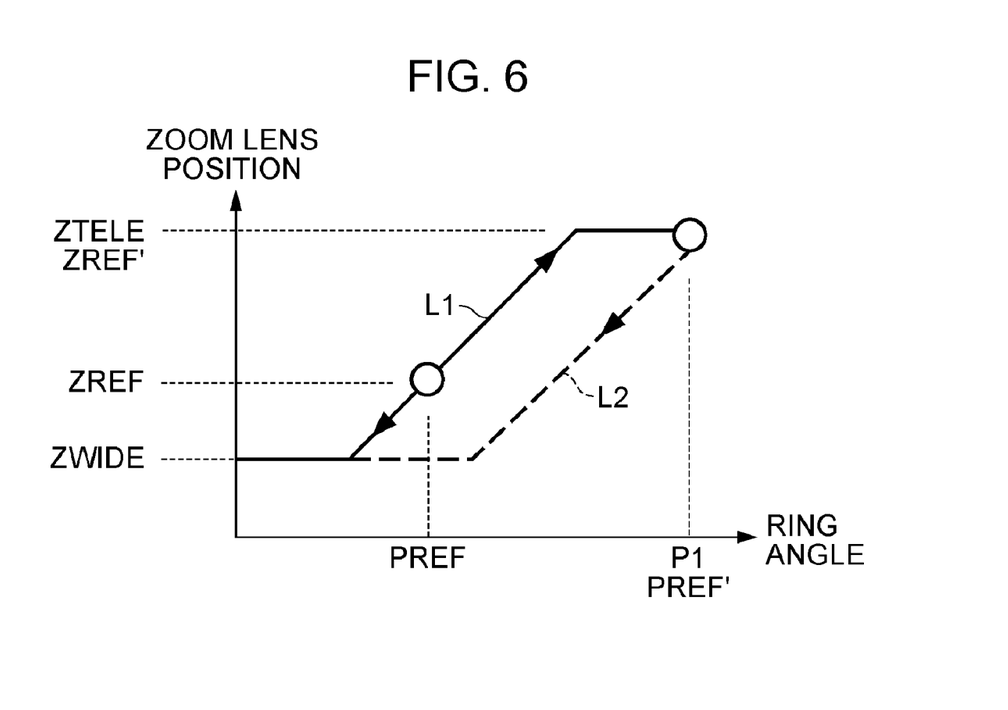
FIG. 6 is a graph showing the relationship between the absolute position of the zoom lens and the ring angle in the first exemplary embodiment of the present invention when a zooming position is matched with a tele end and reference data is re-initialized.

With reference to FIG. 6, a description is made of the relationship between the absolute position of the zoom lens 102 and the ring angle when, as described above, the zooming position Z1 is matched with the tele end position ZTELE or the wide end position ZWIDE and the reference data is re-initialized. FIG. 6 shows an example in which the zooming position Z1 is matched with the tele end position ZTELE.

In FIG. 6, ZREF and PREF represent respectively the reference data of the zooming position and the ring angle before the re-initialization. L1 represents the relationship between the absolute position of the zoom lens 102 and the ring angle corresponding to ZREF and PREF. When the ring 117 is continuously rotated in the plus direction and the ring angle reaches P1, the zooming position is stopped at the tele end position ZTELE because the zooming target position exceeds the tele end position ZTELE. In such a case, ZREF and PREF are canceled and re-initialized by being updated to ZTELE (=Z1) and P1, respectively, in a similar manner to that described above.

ZREF' and PREF' in FIG. 6 represent reference data after the updating and the re-initialization. When the ring 117 is operated thereafter, a relationship L2 corresponding to ZREF' and PREF' is used as the relationship between the absolute position of the zoom lens 102 and the ring angle. As a result of that re-initialization, the relationship between the absolute position of the zoom lens 102 and the ring angle is held in the 1:1 correspondence. In addition, when the ring 117 is operated in the minus direction in the state that the zoom lens 102 is positioned at the tele end, the zoom lens 102 is moved at once in a quick response, thus enabling the user to feel a natural and speedy operation.

Figure 3:
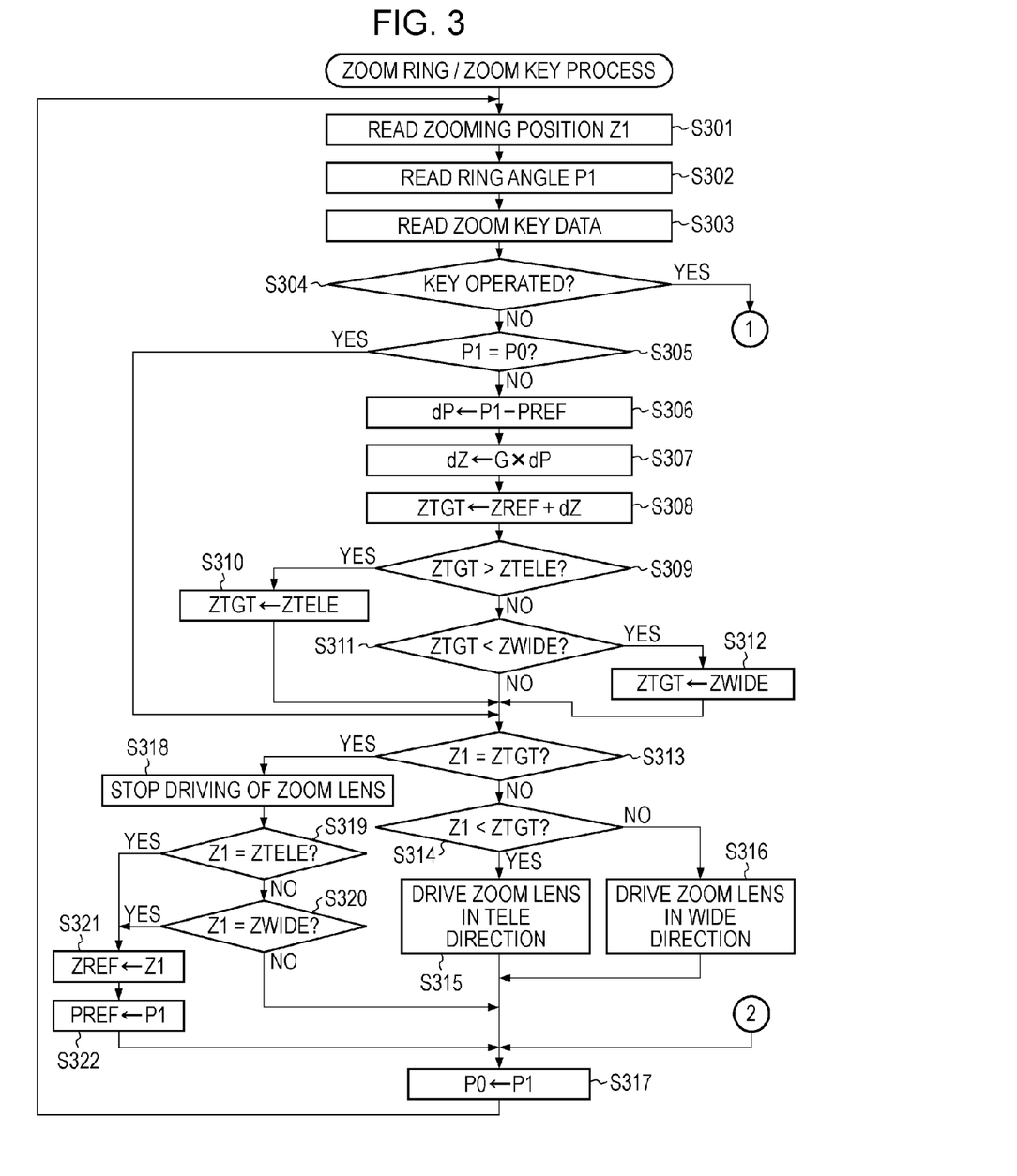
FIG. 3 is a flowchart showing a zoom ring/zoom key process executed in the first exemplary embodiment of the present invention.
Figure 4:
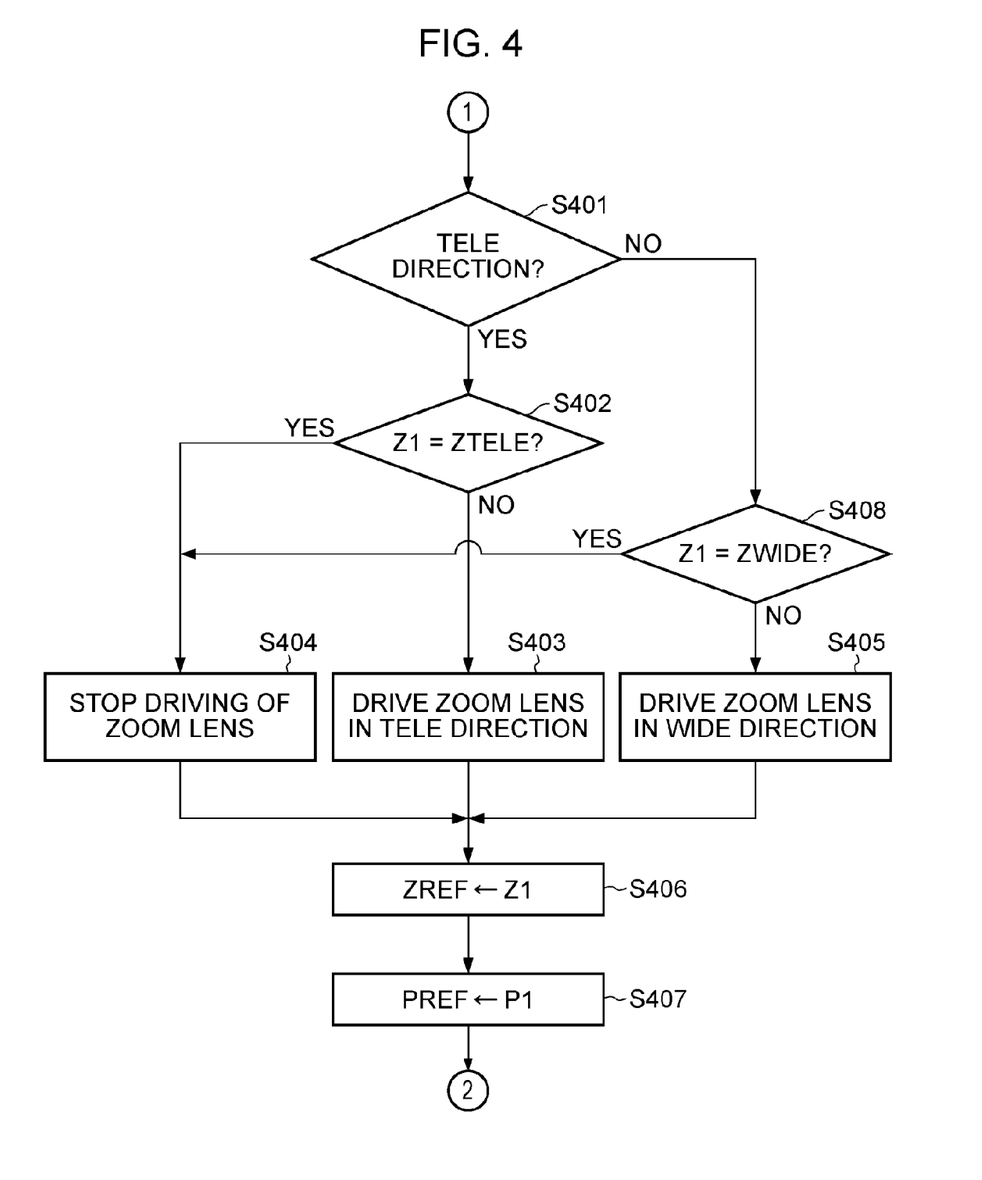
FIG. 4 is a flowchart showing the zoom key process executed in the first exemplary embodiment of the present invention.

If it is determined in step S304 of FIG. 3 that the zoom key 116 is operated by the user, the present corresponding relationship between the absolute position of the zoom lens 102 and the degree of rotation of the ring 117 is temporarily canceled. Processing executed subsequent to step S304 in that case will be described below with reference to a flowchart of FIG. 4.

First, in step S401, it is determined whether the zoom key 116 is operated in the tele direction or the wide direction. If the zoom key 116 is operated in the tele direction, the control flow advances to step S402 in which it is determined whether the zooming position Z1 is matched with the tele end position ZTELE. If not matched, this means that the zoom lens 102 is in a movable state. Therefore, the control flow advances to step S403. After driving the zoom lens 102 in the tele direction in step S403, the control flow advances to step S406.

On the other hand, if it is determined in step S402 that the zooming position Z1 is matched with the tele end position ZTELE, the control flow advances to step S404 because the zoom lens 102 cannot be moved beyond the tele end position ZTELE. After stopping the driving of the zoom lens 102 in step S404, the control flow advances to step S406.

If it is determined in step S401 that the zoom key 116 is operated in the wide direction, the control flow advances to step S408 in which it is determined whether the zooming position Z1 is matched with the wide end position ZWIDE. If not matched, the control flow advances to step S405 in which the zoom lens 102 is driven in the wide direction. Then, the control flow advances to step S406. If matched, the control flow advances to step S404 as in the case where the zoom key 116 is operated in the tele direction. After stopping the driving of the zoom lens 102 in step S404, the control flow advances to step S406.

In step S406 and step S407, the reference data ZREF of the zooming position and the reference data PREF of the ring angle are re-initialized respectively to Z1 based on the zooming position Z1 and to P1 based on the ring angle P1. The reason is that, as described above, when the zooming position is changed by the zoom key 116, the preset corresponding relationship between the ring angle and the zooming position is lost. Thus, when the zoom key is operated, the reference data of both the zooming position and the ring angle are updated to a new corresponding relationship after being temporarily cleared and canceled. The preset corresponding relationship between the ring angle and the zooming position can be held again by re-initializing those reference data in such a way. The canceling and the updating of the corresponding relationship can be performed at the same time.

The re-initialization can be made at such timing that the corresponding relationship is canceled when the zoom key 116 is operated, and that it is updated when the ring 117 is operated again.

Thereafter, the control flow returns to step S317 of FIG. 3 and the subsequent processing is continued.

Figure 7:
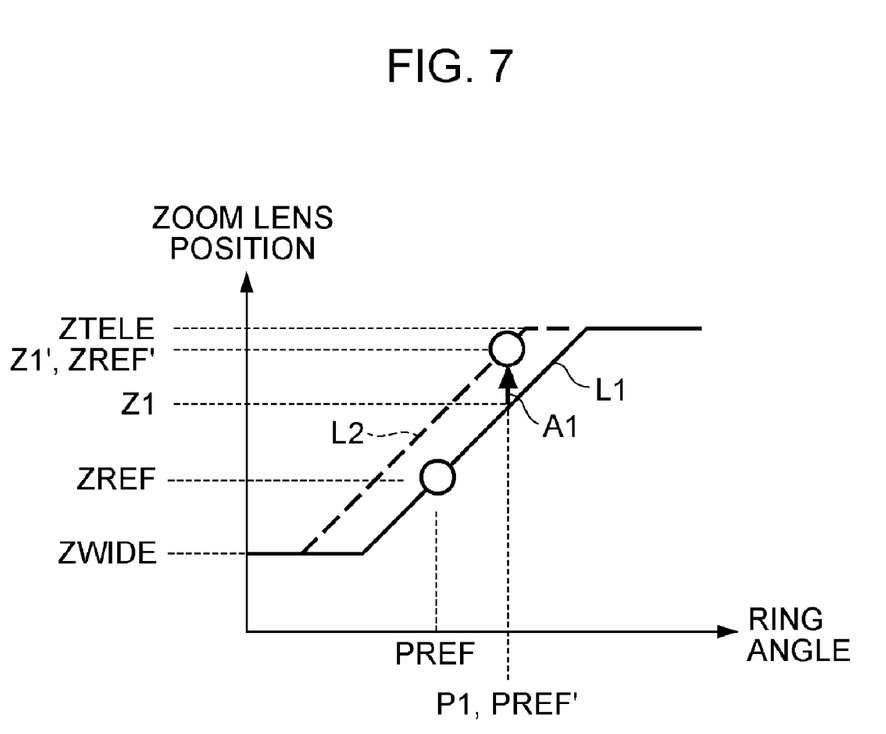
FIG. 7 is a graph showing the relationship between the absolute position of the zoom lens and the ring angle in the first exemplary embodiment of the present invention when the zooming position is operated by the zoom key and the reference data is re-initialized.

FIG. 7 is a graph showing the relationship between the absolute position of the zoom lens 102 and the ring angle when the zooming position is changed by the zoom key 116 as described above.

In FIG. 7, ZREF and PREF represent respectively the reference data of the zooming position and the ring angle before the re-initialization, and L1 represents the relationship between the absolute position of the zoom lens 102 and the ring angle corresponding to ZREF and PREF. It is here assumed that, when the ring angle is P1, the zoom lens 102 is moved by the zoom key 116 from Z1 to Z1' as indicated by an arrow A1. In such a case, ZREF and PREF are re-initialized to Z1' and P1, respectively, in a similar manner to that described above.

ZREF' and PREF' in FIG. 7 represent reference data after the re-initialization. When the ring 117 is operated thereafter, a relationship L2 corresponding to ZREF' and PREF' is used as the relationship between the absolute position of the zoom lens 102 and the ring angle. As a result of that re-initialization, the relationship between the absolute position of the zoom lens 102 and the ring angle is held in the 1:1 correspondence even when the relationship between the zooming position and the ring angle is deviated from the 1:1 correspondence with the operation of the zoom key.

The above description is made in connection with the case using the zoom key 116 as a zoom operating unit other than the ring 117. However, even when the zooming operation is performed by using a remote controller, control can also be executed through similar processing to that in the case using the zoom key 116.

Thus, according to the first exemplary embodiment, the absolute position of the zoom lens 102 is controlled (in steps S308-S317 of FIG. 3) with respect to the angle of the ring 117. Further, the corresponding relationship between the absolute position of the zoom lens 102 and the angle of the ring 117 is re-initialized (in steps S321 and S322 of FIG. 3 and steps S406 and S407 of FIG. 4). It is therefore possible to reduce the occurrence of a malfunction caused by a deviation from the proper corresponding relationship between the absolute position of the zoom lens 102 and the ring angle, while giving the user an operation feel close to that in the case of the lens using the mechanical cam mechanism. As a result, the zooming operation can be realized in an intuitively-fit and natural way. In addition, when the first exemplary embodiment is applied to the focusing operation, the focusing operation can also be similarly realized in an intuitively-fit and natural way.

Second Exemplary Embodiment

An image pickup apparatus according to a second exemplary embodiment of the present invention will be described below. Since the construction of the image pickup apparatus is the same as that in the first exemplary embodiment (FIG. 1), a description thereof is omitted here.

In the first exemplary embodiment, a ring of the absolute value type is used as the ring 117. As described above in connection with the related art, however, a ring of the relative value type is more advantageous in cost, performance, etc. In view of that point, the second exemplary embodiment of the present invention is described in connection with the case where a ring of the relative value type is used as the ring 117.

Figure 8:
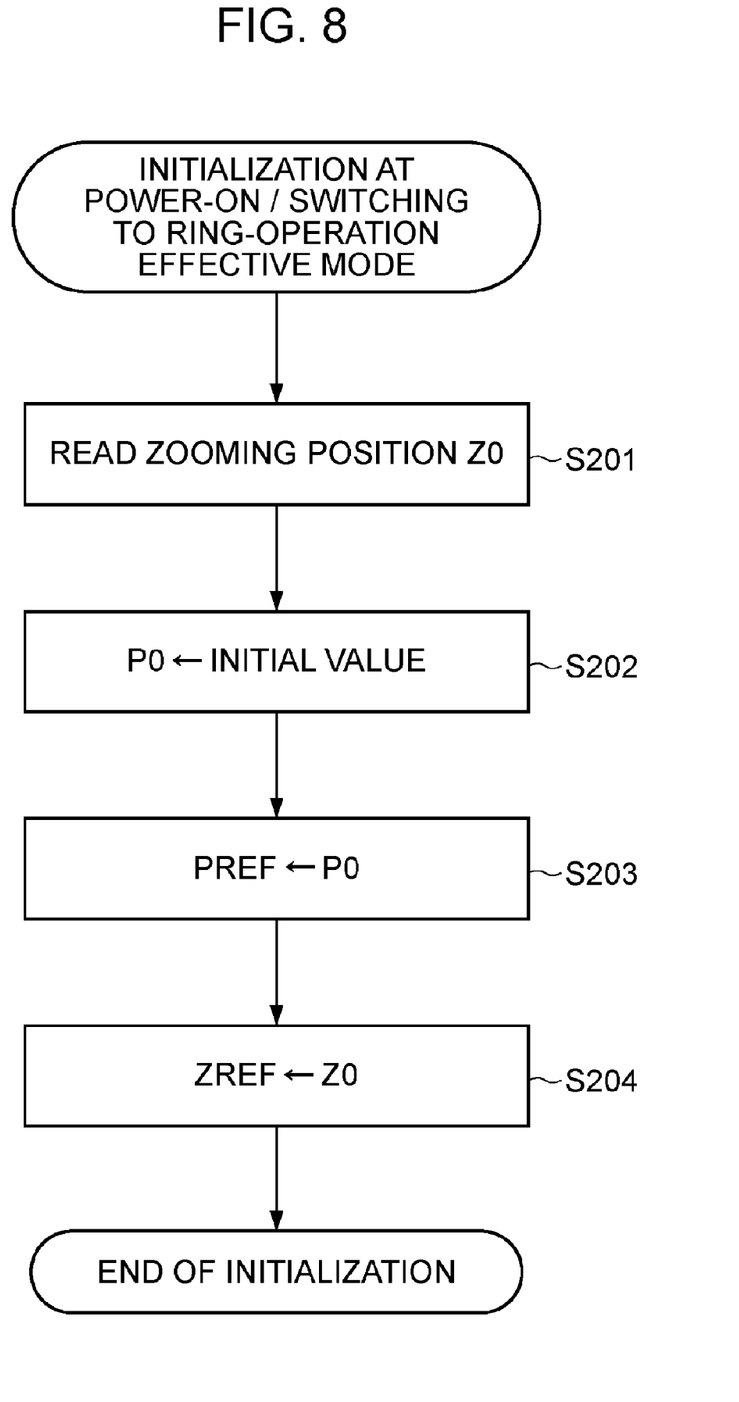
FIG. 8 is a flowchart showing an initialization process executed in an image pickup apparatus according to a second exemplary embodiment of the present invention at least when supply of power to the image pickup apparatus is turned on or when the mode in which operation by the zoom ring is effective is selected.

FIG. 8 is a flowchart showing an initialization process executed by the camera microcomputer 114 at least when power supply to the image pickup apparatus is turned on or when a mode in which the zooming operation by the ring 117 is effective is selected.

Step S201 of FIG. 8 is the same as step S101 of FIG. 2, described in the first exemplary embodiment, which shows the process of initializing the ring of the absolute value type. The zooming position read in step S201 is set to Z0. Because an absolute angle is not obtained with the ring 117 of the relative value type, a predetermined initial value is set as the initial ring angle P0 in step S202. The initial value can be given by, e.g., a midpoint value "32768" of 2-byte data "0-65535". Subsequent steps S203 and S204 are the same as steps S103 and S104 of FIG. 2, described in the first exemplary embodiment, which shows the process of initializing the ring of the absolute value type. With the processing of steps S203 and S204, the initial state of the corresponding relationship between the absolute position of the zoom lens 102 and the ring angle is stored.

Even in the case using the ring 117 of the relative value type, by initializing the ring angle P0 to the predetermined initial value at least when the power supply to the image pickup apparatus is turned on or when the mode in which the zooming operation by the ring 117 is effective is selected, subsequent control can be performed in a similar manner to the case using the ring of the absolute value type. In other words, angle data of the ring of the relative value type can be obtained by successively adding or subtracting a relative angle (rotational angle) of the ring 117, which is detected by the ring angle sensor 118, to the initial value depending on the rotating direction of the ring. Therefore, subsequent processing can be executed in the same manner as in the first exemplary embodiment in which the ring of the absolute value type is used. A description of the subsequent processing is hence omitted here.

Thus, according to the second exemplary embodiment, further cost reduction and a further improvement in performance of the image pickup apparatus can be realized by using the ring of the relative value type that is superior in cost, performance, etc. to the ring of the absolute value type used in the first exemplary embodiment.

Third Exemplary Embodiment

Figure 9:
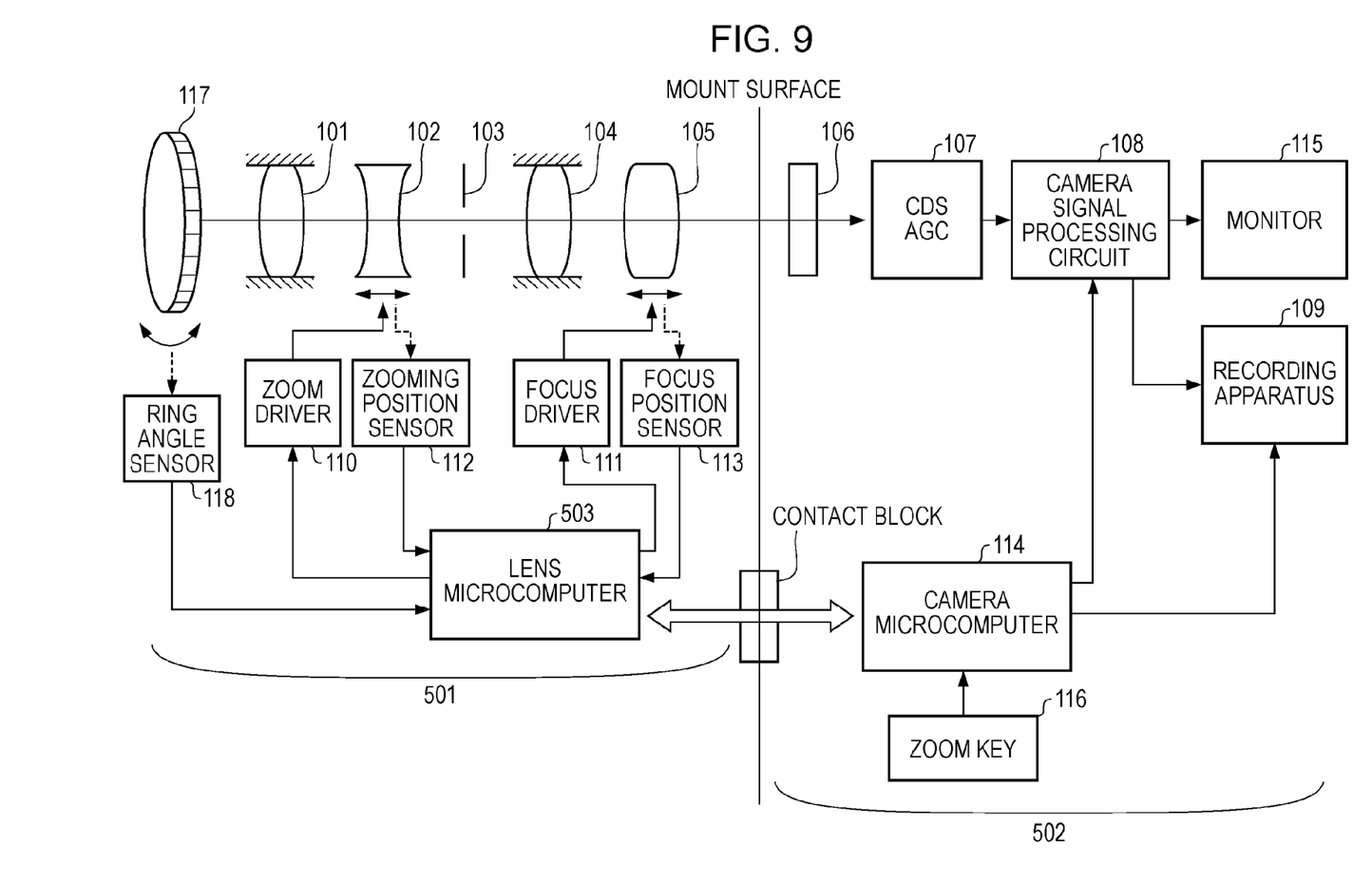
FIG. 9 is a block diagram of an image pickup apparatus according to a third exemplary embodiment of the present invention, which is in combination of an image pickup lens and an image-capturing unit.

FIG. 9 is a block diagram of an image pickup apparatus according to a third exemplary embodiment of the present invention, which is in combination of an image pickup lens and an image-capturing unit. The same components as those in FIG. 1 are denoted by the same characters.

In this third exemplary embodiment, the image pickup apparatus comprises a camera body 502 serving as an apparatus body and an image pickup lens 501, which is detachably attached to the former. A lens microcomputer 503 for supervising control on the lens side is incorporated in the image pickup lens 501, and the zoom driver 110 and the focus driver 111 are controlled by the lens microcomputer 503. Also, respective outputs of the zooming position sensor 112, the focus position sensor 113, and the ring angle sensor 118 are input to the lens microcomputer 503.

On the other hand, the zoom key 116 is mounted on the camera body 502. This is because, in consideration of operability, the zoom key 116 is usually disposed near a grip, which supports a camera. Accordingly, an output of the zoom key 116 is input to the camera microcomputer 114 incorporated in the camera body 502.

The lens microcomputer 503 and the camera microcomputer 114 are capable of communicating data with each other through a contact block disposed at a mount surface between the camera body 502 and the image pickup lens 501. The camera microcomputer 114 transmits the output of the zoom key 116 to the lens microcomputer 503 at a predetermined cycle (e.g., a cycle at which a vertical sync signal for an image signal is generated) via communication.

With the arrangement of the third exemplary embodiment, zoom control similar to that described in the first and second exemplary embodiments can be realized in the image pickup lens 501 alone by executing the zoom control in response to the operation of the ring 117 and the operation of the zoom key 116 in the lens microcomputer 503, which are executed in the camera microcomputer 114 in the first and second exemplary embodiments. As a result, in the image pickup apparatus in which the image pickup lens 501 is detachably attached to the camera body 502, the zooming operation can also be realized in an intuitively-fit and natural way as in the image pickup apparatus in which the image pickup lens and the image-capturing unit are integral with each other. Additionally, the third exemplary embodiment is applicable to any case where the ring 117 is of the absolute value type or the relative value type similarly to the first and second exemplary embodiments.

In FIG. 9, the camera microcomputer 114 can receive information from the lens microcomputer 503 and can instruct and control the zooming position. In that case, the lens microcomputer 503 controls the zoom driving in accordance with instructions from the camera microcomputer 114.

The features of the first to third exemplary embodiments are summarized below.

As described above in connection with the related art, the method of controlling the lens position, instead of the lens speed, depending on the amount of input operation of the lens is superior in operability, but it accompanies with the problem that the 1:1 correspondence between the absolute angle of the ring and the absolute position of the lens is lost. In order to avoid that problem, a unit for initializing the corresponding relationship between the amount of input operation of the ring and the absolute position of the lens (i.e., a unit for executing the initialization process shown in FIG. 2) is disposed in the first to third exemplary embodiments. With the provision of such a unit, it is possible to reduce the occurrence of a malfunction caused by a deviation from the proper corresponding relationship between the amount of input operation of the ring and the absolute position of the lens. The lens includes at least one of the zoom lens 102 and the focus lens 105.

Also, a physical limit is not set in the range of rotational angle of the ring 117 so that the ring can be infinitely rotatable. With the ring 117 being able to infinitely rotate, there is no physical limit on the rotational angle of the ring in the process of initializing the above-described corresponding relationship, thus resulting in a more significant advantage in practice.

The initializing unit serves as a unit for executing the initialization process at least when the supply of power to the image pickup lens or the image pickup apparatus is turned on or when the mode in which the zooming operation by the ring 117 is effective is selected. Namely, it serves as a unit for executing the initialization process prior to the start of the zooming operation. Accordingly, at the same time as when the operation of the ring 117 becomes effective, the relationship between the angle of the ring 117 and the absolute position of the zoom lens 102 or the focus lens 105 is established. In other words, it is just required to make the angle of the ring 117 and the lens position correspondent to each other at the time when the operation of the ring 117 becomes effective. This means that the present invention can be applied to not only the ring of the absolute value type, but also to the ring of the relative value type that is more advantageous in cost and resolution.

Further, even after the operation of rotating the ring 117 is stopped, the zoom driving and the focus driving are controlled so as to continue until the lens reaches the absolute position thereof that corresponds to the detected signal from the ring angle sensor 118. Such control is executed in consideration of the case that, when a motor for the zoom driving or the focus driving has a speed limit, the lens cannot follow the ring operation when the ring 117 is very quickly rotated. By executing the control in such a manner, although the lens driving is delayed, the relationship between the angle of the ring 117 and the absolute position of the lens can be held in the preset 1:1 correspondence.

Still further, when the absolute position of the lens corresponding to the detected signal from the ring angle sensor 118 exceeds the movable range of the lens which is decided from the physical or optical point of view, the lens driving is stopped and the initializing unit re-initializes the corresponding relationship between the detected signal and the absolute position of the lens. More specifically, when the ring 117 capable of infinitely rotating is used, as described above, there is a possibility that the absolute position of the lens corresponding to the rotational angle of the ring 117 may exceed the movable range of the lens. In such a case, the lens driving is stopped at the end of the movable range of the lens and the corresponding relationship between the angle of the ring 117 and the absolute position of the lens is re-initialized. With that re-initialization, it is possible to avoid a mismatch between the angle of the ring 117 and the absolute position of the lens while the absolute position of the lens is maintained within the movable range of the lens.

Moreover, the zoom key 116 is disposed, in addition to the ring 117, as a separate operating member for changing the lens position. When the lens position is changed by the zoom key 116, the initializing unit re-initializes the corresponding relationship between the detected signal from the ring angle sensor 118 and the absolute position of the lens. Stated another way, when the lens position is changed by, e.g., a volume key or a remote controller for controlling the lens position other than the ring 117, the corresponding relationship between the angle of the ring 117 and the absolute position of the lens is re-initialized so that a mismatch of the corresponding relationship between them can be avoided.

According to the first to third exemplary embodiments of the present invention, in the zooming operation using the ring 117 and in the manual focusing operation, it is possible to reduce the occurrence of a malfunction caused by a deviation from the proper corresponding relationship between the absolute position of the lens and the ring angle, while giving the user an operation feel close to that in the case of the lens using the mechanical cam mechanism. As a result, the zooming operation can be realized in an intuitively-fit and natural way.

The above-described embodiments are merely exemplary of the present invention, and are not to be construed to limit the scope of the present invention.

Furthermore, all modifications and changes belonging to equivalents of the claims are considered to fall within the scope of the present invention.

This application claims the benefit of Japanese Patent Application No. 2006-065407 filed Mar. 10, 2006, which is hereby incorporated by reference herein in its entirety.

What is claimed is:

1. An optical apparatus comprising:
a first operating member adapted to move a lens, the first operating member being infinitely rotatable;
a second operating member adapted to move the lens, the second operating member differing from the first operating member;
a storage unit adapted to store reference position information of the first operating member; and
a control unit adapted to control a position of the lens by an operation of the first operating member or the second operating member,
wherein the control unit controls an amount of movement of the lens by an amount of the operation of the first operating member from a position indicated by the reference position information stored in the storage unit, and cancels the reference position stored in the storage unit when the second operating member is operated after the operation of the first operating member.

2. An optical apparatus comprising:
a first operating member adapted to move a lens, the first operating member being infinitely rotatable;
a second operating member adapted to move the lens, the second operating member differing from the first operating member; and
a control unit adapted to control a position of the lens by an operation of the first operating member or the second operating member,
wherein the control unit controls the position of the lens by an amount of the operation of the first operating member from a first position, and
the control unit controls the position of the lens by an amount of the operation of the first operating member from a second position updated from information indicating the first position when the first operating member is operated again after the operation of the second operating member.

3. The optical apparatus according to claim 2, wherein even after the operation of the first operating member is stopped, the control unit moves the lens until the lens reaches a target position of the lens corresponding to an amount of the operation of the first operating member from the second position.

4. An image pickup apparatus to which is mountable an image pickup lens including a driving unit adapted to drive a lens, a first operating member adapted to move the lens and to be infinitely rotatable, and a detecting unit adapted to detect an amount of operation of the first operating member, the image pickup apparatus comprising:
a receiving unit adapted to receive an amount-of-operation signal from the detecting unit;
a second operating member adapted to move the lens; and
a control unit adapted to control a position of the lens by an operation of the first operating member or the second operating member,
wherein the control unit controls the position of the lens by an amount of the operation of the first operating member from a first position, and
the control unit controls the position of the lens by an amount of the operation of the first operating member from a second position updated from information indicating the first position when the first operating member is operated again after the operation of the second operating member.

5. A lens device mountable to an image pickup apparatus including a second operating member adapted to move a lens, and a control unit adapted to control a position of the lens by an operation of the second operating member, the lens device comprising:
the lens;
a driving unit adapted to drive the lens; and
a first operating member adapted to move the lens, the first operating member being infinitely rotatable,
wherein the position of the lens is controlled by an amount of the operation of the first operating member from a first position, and
the position of the lens is controlled by an amount of the operation of the first operating member from a second position updated from information indicating the first position when the first operating member is operated again after the operation of the second operating member.

* * * * *